Sept. 25, 1945.  E. L. DAYTON  2,385,406
FLUID TYPE SEAL
Filed Sept. 2, 1941
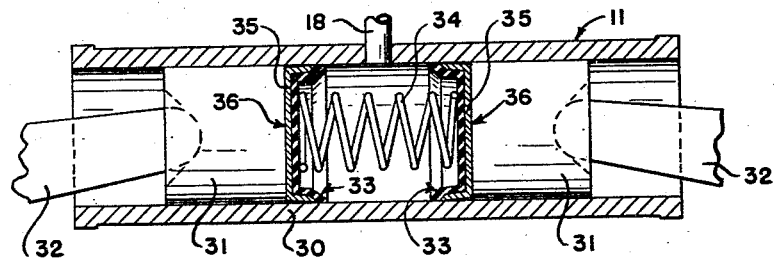
FIG. 1.
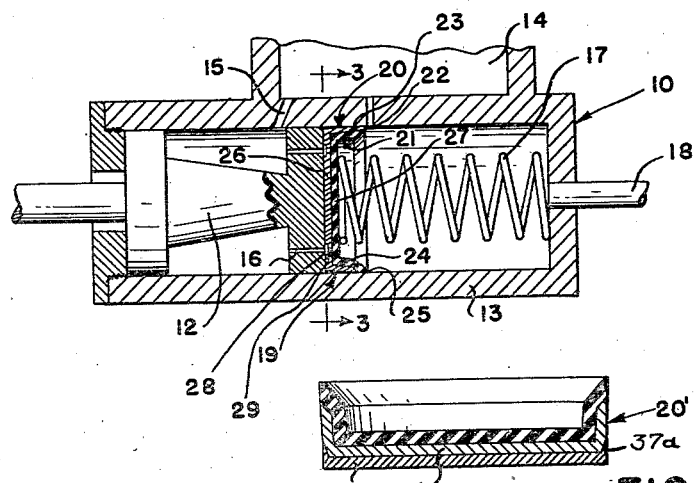
FIG. 2.
FIG. 5.
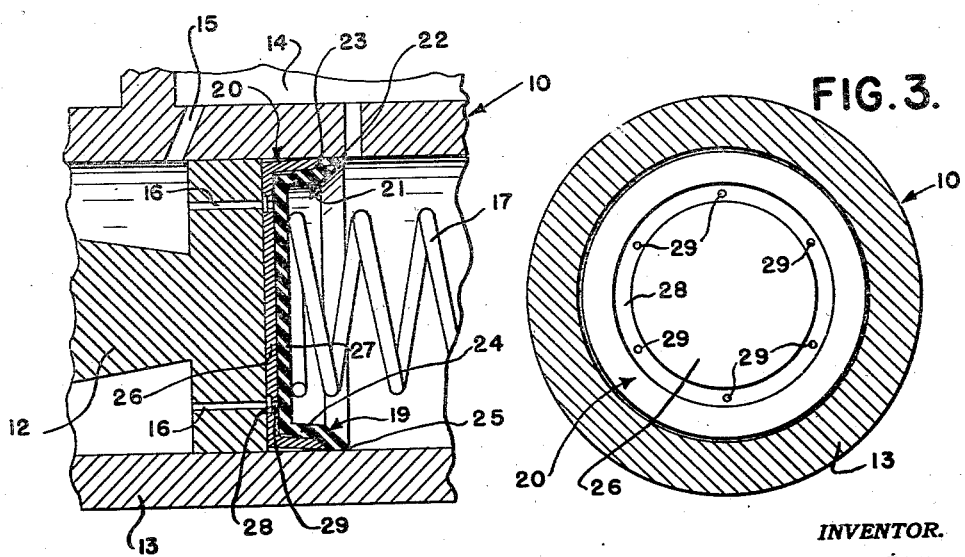
FIG. 3.
FIG. 4.
INVENTOR.
ERNEST L. DAYTON
BY
ATTORNEYS Patented Sept. 25, 1945

2,385,406

UNITED STATES PATENT OFFICE 2,385,406

FLUID TYPE SEAL

Ernest L. Dayton, Detroit, Mich.

Application September 2, 1941, Serial No. 409,303

10 Claims. (Cl. 309—33)

This invention relates generally to fluid seals of the type employed in fluid pressure systems and refers more particularly to an improved liquid seal for preventing the escape of a hydraulic fluid medium in one direction past a piston.

It has been proposed to prevent the escape of fluid past a piston in a hydraulic system by providing a rubber cup-shaped seal having a base portion seated against the pressure end of the piston and having an annular flange frictionally engaging the adjacent wall of the cylinder. It has been found that in use the base portion of the seal has a tendency to extrude into the limited operating clearance provided around the piston and this, of course, caused undue wear of the seal.

It is one of the principal objects of this invention to overcome the above objection by providing a seal having a cup-shaped member of resilient material and having a self-sizing member of relatively good wearing material surrounding the base of the seal to protect the latter.

Another object of this invention resides in the provision of a double seal having axially spaced annular sealing lips, one being formed on a ductile material and the other being formed of a resilient material, such as rubber or a substitute for rubber.

Another object of the present invention resides in the provision of a double seal having a cup-shaped member provided with an annular sealing lip of ductile material at the free edge thereof and having a cup-shaped member of resilient material provided with a base portion seated within the cup aforesaid and further provided with an annular sealing lip spaced axially from the ductile sealing lip previously referred to.

Still another object of this invention consists in providing a seal of the type previously set forth wherein the outside diameter of the annular flange on the outer cup is slightly less than the inside diameter of the cylinder within which the seal is adapted to operate and wherein the diameter of the lip of flexible material on the inside cup is slightly greater than the internal diameter of the cylinder so as to have a uniform wiping engagement with the cylinder wall upon movement of the seal axially of the cylinder. The arrangement is such that the lip on the inside cup initially forms an effective seal with the cylinder wall and the ductile lip on the outer cup responds to pressure rise in the cylinder to expand outwardly into engagement with the cylinder wall so that under working pressures, a compound seal results. Also, inasmuch as the lip on the inner cup-shaped sealing member is of greater diameter than the internal diameter of the cylinder and in view of the fact that the annular lip on the outer cup member is of ductile material, it follows that an effective seal is maintained regardless of wear of the cylinder wall.

A further advantageous feature of the present invention resides in the provision of a compound seal wherein the ductile material from which the lip is formed has no definite elastic limit with the result that there is no tendency for the lip to move inwardly or away from the cylinder wall during operation and, at the same time, permits expansion of the lip under pressures so light that the resistance offered to sliding movement of the seal relative to the cylinder wall is negligible.

The foregoing, as well as other objects, will be made more apparent as this description proceeds, especially when considered in connection with the accompanying drawing, wherein:

Figure 1 is a semi-diagrammatic sectional view of a wheel cylinder forming a part of a hydraulic brake system and embodying my invention;

Figure 2 is a semi-diagrammatic sectional view of a master cylinder having a seal constructed in accordance with this invention;

Figure 3 is a cross sectional view taken substantially on the plane indicated by the line 3—3 of Figure 2;

Figure 4 is a enlarged sectional view illustrating my improved compound seal construction;

Figure 5 is a cross sectional view through a slightly modified form of seal construction.

For the purpose of illustrating this invention, I have shown my improved compound seal as used in connection with a hydraulic brake system, although it will be apparent as this description proceeds that the seal is not limited to this particular application and may be advantageously used in practically all cases where a sliding seal is desired. In detail, I have illustrated in Figures 1 and 2 a hydraulic brake system having a compressor 10 and a brake shoe actuating device 11 operatively connected to the compressor.

The compressor 10 comprises a piston 12 reciprocably mounted in a cylinder 13 communicating with a reservoir 14 adapted to contain a suitable hydraulic fluid medium. In the present instance, the reservoir communicates with the portion of the cylinder at the low pressure side of the piston by means of a port 15 and the fluid in the portion of the cylinder at the low pressure side of the piston is admitted to the portion of the cylinder at the high pressure side of the piston through the medium of passages 16.

The piston 12 is normally urged to its retracted position shown in Figure 2 by means of a spring 17 and is movable against the action of the spring toward the high pressure end of the cylinder by any one of the accepted types of control devices (not shown). It will suffice to point out that movement of the piston 12 in a direction against the action of the spring 17 exerts a pressure on the fluid medium in the cylinder at the high pressure end of the piston and forces this fluid medium through a suitable delivery conduit, designated in Figure 2 by the reference character 18.

It is well established that successful operation of the compressor is largely dependent upon the effectiveness of the seal usually provided at the high pressure end of the piston to prevent the escape of fluid medium past the piston when the latter is moved on its compression stroke against the action of the spring 17. In the present instance, a double seal 19 is provided for this purpose and comprises two interfitting substantially cup-shaped members 20 and 21. The inner surface 22 of the annular flange on the cup-shaped member is tapered outwardly at the free end of the member to form a sealing lip 23. The lip 23 on the free edge portion of the annular flange of the cup-shaped member is formed of a ductile material so as to permit the same to be readily expanded into engagement with the cylinder wall. In the interests of simplicity, the entire cup-shaped member 20 is shown herein as being formed of a ductile material although in most applications, it would be sufficient to fashion only the annular flange or lip portion of the cup-shaped member from such a material.

The inner cup-shaped member 21 is formed of a resilient material, such as rubber or a substitute for rubber and the dimension of the member 21 is such as to permit the same to be nested within the outer member 20 in the manner shown in Figure 4. The annular flange 24 of the inner cup-shaped member 21 extends beyond the sealing lip 23 and the inner surface of this flange is also tapered outwardly at the free end of the cup-shaped member 21 to form a sealing lip 25. It follows from the above that the sealing lip 25 on the inner cup-shaped member 21 is spaced axially from the lip 23 on the outer cup-shaped member 20 and cooperates with the lip 23 to form a double seal.

The double seal 19, previously described, is assembled on the high pressure end of the piston 12 with the base 26 of the outer cup-shaped member bearing against the piston, and with the base 27 of the inner cup-shaped member 21 forming an abutment for one end of the spring 17. As a result, the spring 17 yieldably holds the two cup-shaped members in assembled relationship against the high pressure end of the piston. In the specific application of the seal 19 shown in Figure 2, provision must be made for the hydraulic fluid medium to flow from the low pressure side of the piston to the high pressure side of the latter around the seal. This may be accomplished by forming an annular groove 28 in the outer surface of the base 26 of the member 20 in a manner that this groove registers with the adjacent ends of the passages 16. The annular groove 28, in turn, communicates with the interior of the cup-shaped member 20 and the underside of the resilient member through the medium of circumferentially spaced passages 29 and, since the inner cup-shaped member 21 is merely yieldably held in assembled relationship with the outer cup-shaped member 20, the fluid medium may by-pass the inner cup-shaped member to the high pressure end of the cylinder when the piston is moved to its retracted position.

In actual practice, the outside diameter of the annular flange on the outer cup-shaped member 20 is of less diameter than the internal diameter of the cylinder 13. On the other hand, the annular sealing lip portion 25 on the inner cup-shaped member 21 is of greater diameter than the inside diameter of the cylinder 13. As a result, when the seal is initially inserted in the cylinder, the annular lip 25 on the inner member 21 frictionally engages the wall of the cylinder to form what may be termed a "static" seal. However, as soon as pressure is applied to the annular flange portions of the two cup-shaped members, the lip 23 of ductile material on the outer cup-shaped member expands into frictional engagement with the cylinder wall and cooperates with the lip 25 to form a compound or double seal.

The ductility of the material from which the outer cup-shaped member 20 is formed is such as to permit expansion of the lip 23 into engagement with the cylinder wall under relatively light pressures so that the medium resistance is offered by the seal to reciprocation of the piston. Furthermore, by reason of such an arrangement, the lip 23 will maintain an effective seal regardless of wear or slight inaccuracies in the cylinder wall. It may also be pointed out that the material from which the cup-shaped member 20 is formed is so selected that it has no definite elastic limit and, consequently, will not tend to move radially inwardly once it is urged outwardly by the operating pressure. It has been found that particularly satisfactory results may be obtained by forming the ductile sealing member 20 of a metal alloy having tin or cadmium as the principal base metal. However, the invention should not be limited to the use of ductile metals because certain types of plastics have ductile characteristics and may be employed to form the seal 20.

Upon reference to Figure 1, it will be noted that the actuating device 11 for the brake friction means comprises a cylinder 30 having pistons 31 reciprocably mounted therein between the actuator ends 32 of the brake friction means, and respectively engageable with the latter ends of the brake friction means. The portion of the cylinder between the adjacent ends of the pistons communicates with the delivery conduit 18 to receive fluid under pressure from the high pressure end of the compressor cylinder 13 when the piston 12 is moved against the action of the spring 17. In accordance with conventional practice, the fluid under pressure admitted to the cylinder 30 between the pistons 31 moves the latter outwardly and expands the brake friction means into engagement with the brake drum (not shown).

With the above construction, it is also desirable to prevent the escape of fluid under pressure past the pistons 31 and this is accomplished by a pair of compound seals 33 (Fig. 1) respectively held in assembled relation with the adjacent ends of the pistons 31 by means of the spring 34. The seals 33 are identical in construction to the seal 19 previously described, with the exception that the base portions 35 of the outer cup-shaped member 36 are imperforate since it is not necessary to provide for the transfer of fluid past the seal.

Referring now to the seal shown in Figure 5, it will be noted that this seal differs from the previously described constructions in that a third relatively shallow cup-shaped member 37 is provided having a flange 37a for receiving the base portion 26' of the cup-shaped sealing member 26'. The cup-shaped member 37 is preferably formed of steel or of a metal having a hardness substantially greater than the ductile material from which the seal 20' is fashioned. This upstanding flange construction is particularly desirable where the entire cup-shaped member 20' is fashioned from a ductile material since it prevents spreading or creeping of the base portion 26' of the cup-shaped member 20' under abnormally high pressures.

It will be noted that in each of the embodiments of the invention, the base of the inner cup-shaped sealing member is protected by the base portion of the outer cup-shaped sealing member. This arrangement is particularly advantageous in cases where the inner member is formed of rubber or a substitute for rubber in that it eliminates the danger of the base portion of the inner member extruding around the piston and causing undue wear of the seal.

What I claim as my invention is:

1. A seal for use in fluid pressure systems having a relatively reciprocable cylinder and piston, said seal comprising a member positioned at the pressure end of the piston and having an annular flange provided with an endless annular lip of ductile material engageable with the cylinder wall, and a second member seated within the first member and having an annular flange of resilient material projecting beyond the annular lip of the first member, the annular flange on said second member also terminating in an annular lip engageable with the cylinder wall in spaced relation to the first named annular lip axially of the cylinder.

2. A seal for use in fluid pressure systems having a relatively reciprocable cylinder and piston, said seal comprising a cup-shaped member having a base portion positioned at the pressure end of the piston and having an endless annular flange of ductile metal alloy having as the principal base metal, a metal of the class consisting of tin and cadmium terminating in an anular sealing lip engageable with the cylinder wall, and a second cup-shaped member having a base portion seated against the base portion of the first named cup-shaped member within the latter and having an annular flange of rubber material projecting beyond the annular flange of the first named cup-shaped member and also terminating in an annular sealing lip engageable with the cylinder wall.

3. A seal for use in fluid pressure systems having a relatively reciprocable cylinder and piston, said seal comprising a cup-shaped member having a base portion positioned at the pressure end of the piston and having an annular flange of ductile metal terminating in an annular lip, said annular flange having a diameter less than the diameter of the cylinder and the annular lip on said flange adapted to expand under the action of fluid pressure into sealing engagement with the cylinder wall, and a second cup-shaped member having a base portion extending into the first cup-shaped member and seated against the base portion of the latter, said second cup-shaped member having an annular flange of resilient material projecting beyond the first named annular flange and terminating in an annular sealing lip of greater diameter than the internal diameter of the cylinder for frictionally engaging the cylinder wall.

4. A seal for use in fluid pressure systems having a relatively reciprocable cylinder and piston, said seal comprising a cup-shaped member formed of ductile metal having a base portion positioned at the pressure end of the piston and having an annular flange terminating in an annular lip engageable with the cylinder wall, and a second cup-shaped member formed of rubber material nested in the first named cup-shaped member and having an annular flange projecting beyond the annular lip on the first named flange, the annular flange on the second member also terminating in an annular sealing lip frictionally engageable with the cylinder wall in spaced relation to the first named lip axially of the cylinder.

5. A seal for use in fluid pressure systems having a relatively reciprocable cylinder and piston, said seal comprising a member having a portion positioned at the pressure end of the piston and having an endless annular flange of ductile metal alloy having as the principal base metal, a metal of the class consisting of tin and cadmium, the free edge portion of said annular flange being tapered radially outwardly to form an annular sealing lip engageable with the cylinder wall, and a second member seated against the member aforesaid within the latter and having an annular flange of resilient material projecting beyond the first named flange, the free edge portion of the second named annular flange being tapered radially outwardly to form a second annular sealing lip engageable with the cylinder wall axially beyond the first named lip.

6. A seal for use in fluid pressure systems having a relatively reciprocable cylinder and piston, said seal comprising a cup-shaped member of ductile metal having a base portion positioned at the pressure end of the piston and having an annular flange terminating in an annular lip engageable with the cylinder wall, a second cup-shaped member nested in the first named cup-shaped member, and having an annular flange of resilient material extending beyond the lip on said first named cup-shaped member, said second annular flange also terminating in an annular lip frictionally engageable with the cylinder wall axially beyond the first mentioned lip, and means surrounding the base portion of the first named cup-shaped member and effective to hold the ductile metal in the base portion of the first mentioned cup-shaped member from creeping outwardly under the action of fluid pressure.

7. A seal for use in fluid pressure systems having a relatively reciprocable cylinder and piston, said seal comprising a cup-shaped member of ductile metal having a base portion positioned at the pressure end of the piston and having an annular flange terminating in an annular lip engageable with the cylinder wall, a second cup-shaped member nested in the first named cup-shaped member and having an annular flange of resilient material extending beyond the lip on said first named cup-shaped member, said second annular flange also terminating in an annular lip frictionally engageable with the cylinder wall axially beyond the first mentioned lip, and a third cup-shaped member of a relatively hard metal having a base interposed between the base of the first cup-shaped member and the pressure end of the piston and having an annular flange embracing a portion of the annular flange on the first mentioned cup-shaped member to prevent creeping of the ductile metal forming the base portion of the first named cup-shaped member.

8. A seal for use in fluid pressure systems having a relatively reciprocable cylinder and piston, said seal comprising a cup-shaped seal of resilient material positioned with the base portion adjacent the pressure end of the piston, and a member having an endless annular portion of ductile metal alloy having as the principal base metal, a metal of the class consisting of tin and cadmium surrounding the base portion of the seal and slidably engaging the cylinder wall.

9. A seal for use in fluid pressure systems having a relatively reciprocable cylinder and piston, said seal comprising a cup-shaped member having a base portion positioned at the pressure end of the piston and having an endless annular flange of ductile material terminating in an annular sealing lip engageable with the cylinder wall, the side of the base adjacent the piston having a port therethrough communicating with a passage through the piston, a second cup-shaped member of resilient material having a base portion seated in the base of the first member and collapsible under the action of fluid under pressure flowing through said port and passage, to permit the fluid to escape to the pressure side of the piston, and a sealing lip on the free end of the second cup-shaped member positioned beyond the lip on the first member and engageable with the cylinder wall.

10. A seal for use in fluid pressure systems having a relatively reciprocable cylinder and piston, said seal comprising three cup-shaped members nested together and positioned at the pressure end of the piston with the flanges extending outwardly from the piston in the general direction of the axis of the latter, the intermediate member being formed of ductile metal and having the extremity of the flange thereof engageable with the cylinder wall, the inner member being formed of a resilient material and having an annular lip portion on the extremity of the flange thereof projecting beyond the flange on the ductile member for engagement with the cylinder wall, and the outer cup-shaped member being formed of a material which is more rigid than the ductile metal of the intermediate member and is provided with a relatively short flange which embraces the base portion of the intermediate member to prevent spreading of the latter.

ERNEST L. DAYTON.